Patented July 29, 1947

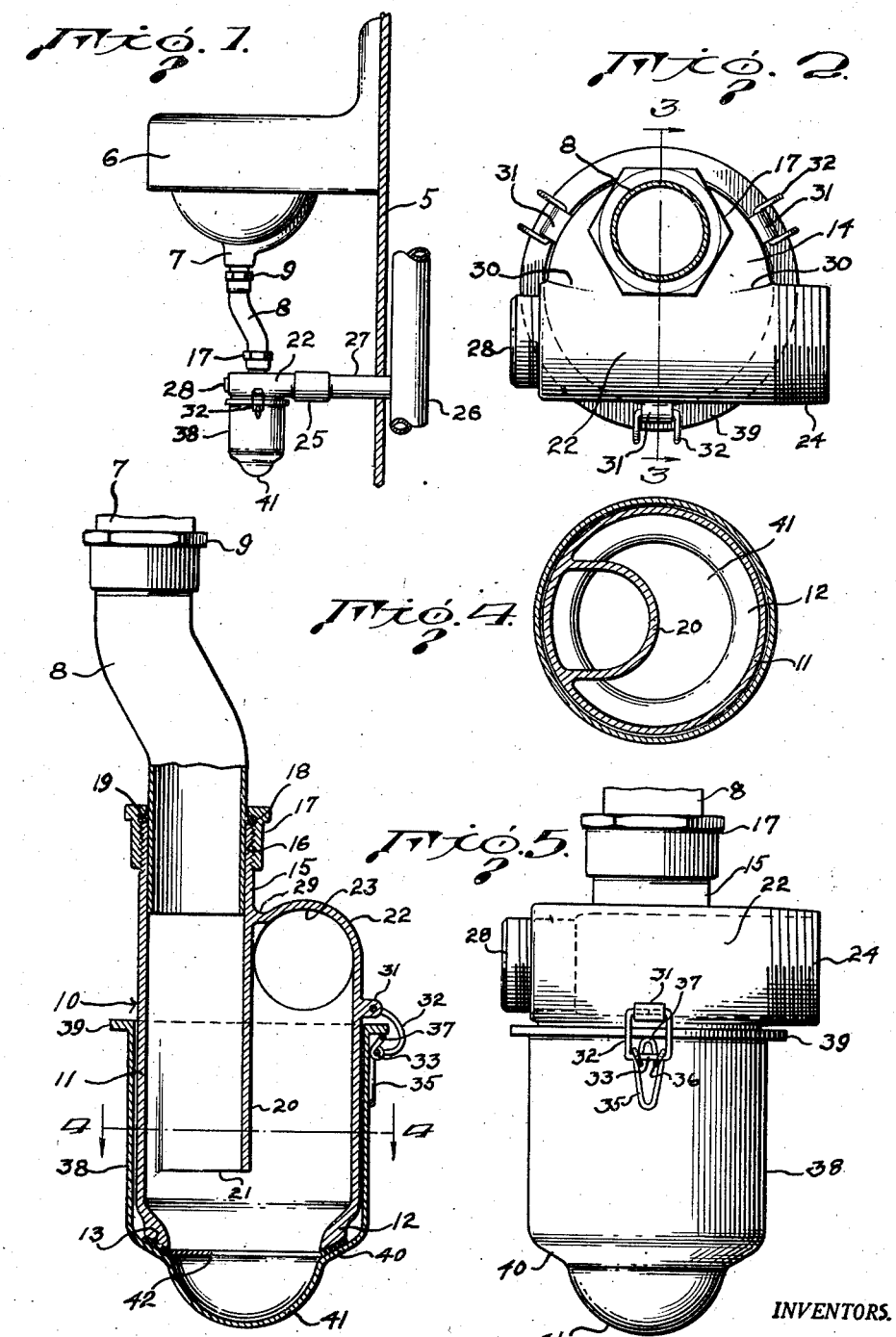

2,424,548

UNITED STATES PATENT OFFICE 2,424,548

SINK TRAP

Harry A. Bell and Walter S. Allen, Detroit, Mich.

Application November 15, 1943, Serial No. 510,353

2 Claims. (Cl. 182—24)

The present invention relates to sewerage, and more particularly to liquid seal traps for basins, sinks and the like.

The primary object of the invention is to provide a liquid seal trap for excluding the obnoxious gases from the sewerage system into the home or dwelling and to provide a liquid seal trap with a removable sump to facilitate the easy cleaning and removal of sediment therefrom.

Another object of the invention is to provide a liquid seal trap particularly adapted for use in connection with sinks, basins and the like which is constructed of transparent material such as a plastic or composition derived from a phenolic condensation product so that the interior of the trap will be visible at all times and may be inspected periodically so that the same can be removed and cleaned such as when considerable sediment has collected in the removable sump.

Another object of the invention is to provide a liquid seal trap of the above-mentioned type having a removable sump adapted to be connected with the body portion of the trap by means of unique and novel clamping members which are easily and readily releasable to allow the removal of the sump for the purpose of cleaning and removing the sediment therefrom.

Another object of the invention is to provide a liquid seal trap particularly adapted for basins and sinks in which the area of the down spout or pipe is considerably smaller in diameter than the outlet side of the trap so as to prevent siphoning of the liquid seal away from the trap by suction created in the downpipe of the sewerage system.

Another object of the invention is to provide a liquid seal trap of the above-mentioned type in which the downspout area and outlet area differentiation prohibits and eliminates such disadvantages and faults as found in present-day liquid seal traps such as siphonage, capillary wickage, excessive back pressure, wind oscillation and aspiration.

Another object of the invention is to provide a liquid seal trap in which the removable sump is sealed at a considerable depth below its top edge against the escape of water from the trap by means of a rubber packing ring interposed between the lower portion of the body of the trap and a seat portion formed on the lower portion of the sump so that said packing member will prevent the escape of water into the space between the sidewalls of the sump and trap body when the sump is tightly clamped in position whereby when the sump is removed and the water in the trap descends in a sudden rush, it will not overflow from the sump like the ordinary type, but there will be adequate volume in which to hold all of the water.

Another object of the invention is to provide a liquid seal trap for sewerage systems and particularly sinks, and basins in which the body portion is formed with a straight line passageway at the outside of the trap to facilitate the insertion of a brush or the like and thereby free the pipe connecting the trap to the downpipe of any sediment deposited or collected therein, and to provide said straight line passageway with a removable closure plug in a readily accessible position.

Another object of the invention is to provide a liquid seal trap having a relatively long downspout or inlet extending into the sealing liquid a considerable distance to prevent the escape of sewer gases into the dwelling or building structure from passing around the lower edge of said downspout or inlet pipe and therethrough to the interior of the building.

Other objects and advantages of the invention will become apparent during the course of the following description of the accompanying drawing, wherein:

Figure 1 is a side elevational view of a liquid seal trap embodying the invention, showing the same applied interposed between a sink and sewage downpipe;

Figure 2 is a top plan view of the liquid seal trap showing the same greatly enlarged and illustrating the general shape and contour thereof;

Figure 3 is a vertical cross-sectional view taken on line 3—3 of Figure 2 looking in the direction of the arrows and illustrating in detail the structural features of the liquid seal trap and its removable sump;

Figure 4 is a horizontal cross-sectional view taken on line 4—4 of Figure 3 further illustrating the shape of the liquid seal trap and showing the area differential between the downspout or inlet and the outlet area; and Figure 5 is an enlarged side elevational view of the liquid seal trap illustrating in detail one of the hinged clamping members for retaining the removable trap sump in place.

General description of the invention

The invention broadly comprises a liquid seal trap particularly adapted for use in domestic buildings for collecting sediment passing through the downspout of a sink or the like and to provide a removable sump to permit the cleaning of the trap and removal of sediment therefrom without displacing the volume of water contained in the trap. Further, the invention embodies a liquid seal trap which is adapted to be formed of a plastic material, so that the contents of the sump will be readily visible from time to time to permit cleaning thereof at frequent intervals according to the visible condition thereof. Also, the liquid seal trap includes a novel hinged clamping member for securely clamping and retaining the sump in position so as to cause a seat portion thereon to tightly engage a packing member to be clamped tightly against a seat on the lower portion of the trap body and thereby seal the trap and sump against leakage should the liquid level in the trap for any reason whatsoever be raised above its normal height.

*Detailed description of the invention*

In the drawing, wherein for the purpose of illustrating the invention like reference characters will be employed to designate like parts throughout the same, the reference character 5 will generally be employed to designate the wall of a house or dwelling to which is secured a sink or basin 6 having an outlet 7 and a drain pipe 8 connected thereto by a threaded coupling sleeve 9.

The above structure is conventional and the invention comprises a liquid seal trap including a body portion generally represented by the reference character 10 formed of a cylindrical wall member 11 preferably molded and formed of a plastic material such as a synthetic resin or phenolic condensation product. The body portion 10 is open at its lower end and is reduced as at 12 to form an angularly disposed packing ring seat 13. A top wall 14 is provided at the other end of the cylindrical housing 10 and said top wall is formed with a tubular extension 15 having an upper threaded portion 16 for receiving a gland nut 17. The gland nut 17 is recessed as at 18 for receiving an annular packing element 19 adapted to contactually engage the lower end of the drain pipe 8 and provide an effective seal for the joint between the drain pipe and the liquid seal trap. It is to be noted that the drain pipe 8 extends into the tubular extension 15 a considerable distance as shown in Figure 3.

Formed integral with the cylindrical wall member 11 is a downpipe 20 which is likewise formed integral and co-extensive with the tubular extension 15 and said downpipe 20 is of semi-cylindrical form with the ends thereof as shown in Figure 4 integrally connected to the cylindrical wall member 11. The lower end of the downpipe 20 terminates as at 21 adjacent the reduced portion 12 of the cylindrical body member 11 so as to extend well down within a body of sealing liquid contained in the trap.

The top wall 14 of the cylindrical body member 11 is provided with a tubular housing 22 and said housing is formed integral with the top wall so that the horizontal transverse bore thereof 23 is in communication with the interior of the cylindrical body member 11. One end of the tubular housing 22 is threaded externally as at 24 for receiving a coupling sleeve (Figure 1) so that the outlet side of the liquid seal trap may be connected to the downpipe 26 of the sewage system by means of an interconnecting pipe 27. The opposite end of the tubular housing 22 is internally threaded for receiving a removable closure plug 28 to facilitate the insertion of a wire brush for the purpose of cleaning the housing extension 22 as well as the interconnecting pipe 27.

It is intended to form or mold the cylindrical body member 11, tubular housing 22 and tubular extension 15 in one piece, and as will be noted, the tubular housing 22 is joined to the tubular extension 15 by a web portion 29 while the tubular extension 22 is joined to the top wall 13 by similar web portions 30.

Also formed integral with the cylindrical body member 11 is a plurality of circumferentially spaced lugs 31 having tangentially disposed openings with a reception of the ends of a U-shaped hinged member 32 arcuately curved so that the free end 33 will be presented inwardly and toward the cylindrical body member 11 as shown in Figure 3. A wire clamping member 35 is provided with loop portions 36 which are adapted to encircle the straight portion of the U-shaped hinge member 32 as is clearly shown in Figure 5 so that the offset end 37 will provide a clamping member adapted to engage and retain the removable sump in place.

The removable sump 38 is likewise formed of a plastic material having transparent characteristics and said removable sump is substantially cup-shaped and is provided at its upper end with an annular flange 39 adapted to be engaged by the swinging end 37 of the clamping lever 35. The lower end of the cup-shaped sump 38 is tapered inwardly as at 40 so as to provide a seat portion complementary with the seat portion 13 formed on the lower end of the cylindrical casing 11. The lower end of the cup-shaped sump 38 terminates in a semi-spherical sediment collection chamber 41 in direct alignment with the interior of the cylindrical wall member 11. Interposed between the seat 13 and the tapered portion 40 is a rubber packing member 42 similar to a conventional fruit jar sealing rubber so that in the event that the rubber becomes brittle and disintegrated, the same may be replaced by an ordinary fruit-jar sealing ring.

It is to be noted that by lifting the clamping levers 35 outwardly, the free ends 37 thereof will be moved out of clamping engagement with the flange 39 so as to permit the easy removal of the sump 38 for the purpose of removing sediment collected in the chamber 41. Further, it is to be noted that when the sump is replaced, the clamping lever 35 will engage the wall of the sump as shown in Figure 3 so that the free end will be off center from the connecting portion 33 of the U-shaped hinge member 32 which will securely lock the sump in position and draw the tapered portion 40 thereof into tight sealing engagement with the rubber packing ring 42 and seat 13.

It will be evident from Figure 3 that because of the fact that the gasket 42 is located at a seat 13 which is near the lower end of the sump 38, the liquid seal is effected low in the sump 38, hence when the sump 38 is removed to clean the trap, the sump 38 has sufficient capacity to receive all of the liquid within the trap without overflow. Accordingly, this construction prevents any spilling of the contents of the trap onto the floor, as occurs in prior types of trap where the sump cup is sealed near its top. In such prior traps, the sump cap is already full of liquid before it is removed, hence the liquid flowing out of the trap causes the sump cup overflow, spilling liquid and sediment onto the floor.

It is to be understood that the form of the invention herewith shown and described is to be taken as a preferred embodiment of the same and that various changes in the shape, size and arrangement of parts may be resorted to without departing from the spirit of the invention or the scope of the subjoined claims.

What we claim is:

1. A liquid seal trap comprising a body portion, an inlet pipe connected to the body portion and having its lower end terminating adjacent the lower end thereof, a tubular member connected to the body portion and providing an outlet, a cup-shaped sediment sump for the lower end of the cylindrical body portion, complementary packing seats formed on the lower portions of said casing and sump, a packing ring interposed between said packing seats, and clamping members interconnecting said sump and said body portion for removably holding said sump in sealing contact with said body portion, said sump having its sidewall extending upwardly relatively to the sidewall of said body portion and having its upper edge disposed remote from said packing seats.

2. A liquid seal trap for basins and sinks comprising a casing having an inlet and an outlet, said casing having its lowermost end open and provided with a surrounding packing seat, a cup-shaped sediment receptacle received on the lower end of the casing for closing the open end thereof, a receptacle having its sidewall extending upwardly co-extensive with the sidewall of said casing and having its upper edge disposed remote from said packing seat, a packing seat formed on the lower portion of said cup-shaped receptacle complementary with said first-mentioned packing seat, a packing ring interposed between said first and last-mentioned seats, and a fastening device disposed between said receptacle and said casing for detachably holding said cup-shaped receptacle on said casing, said receptacle having a bottom portion extending downwardly below said packing seats to provide a sediment chamber therein.

HARRY A. BELL.
WALTER S. ALLEN.

REFERENCES CITED

The following references are of record in the file of this patent:

UNITED STATES PATENTS

| Number | Name | Date |
|---|---|---|
| 1,102,136 | Calhoun | June 30, 1914 |
| 1,884,855 | Pyrce | Oct. 25, 1932 |
| 1,768,599 | Holbrook | July 1, 1930 |
| 2,166,279 | Barwick | July 18, 1939 |

FOREIGN PATENTS

| Number | Country | Date |
|---|---|---|
| 40,292 | Germany | July 30, 1887 |
| 362,309 | Great Britain | Dec. 3, 1931 |